United States Patent [19]

Vogel

[11] Patent Number: 4,930,158
[45] Date of Patent: May 29, 1990

[54] SELECTIVE VIDEO PLAYING SYSTEM

[76] Inventor: Peter S. Vogel, 28 Adeline St., Faulconbridge, NSW 2776, Australia

[21] Appl. No.: 237,175

[22] Filed: Aug. 29, 1988

[30] Foreign Application Priority Data

Sep. 2, 1987 [AU] Australia .................. PI4107

[51] Int. Cl.$^5$ .................................. H04N 7/16
[52] U.S. Cl. .............................. 380/5; 380/20; 380/23; 358/349
[58] Field of Search .............. 380/3, 5; 358/349; 340/825.31, 825.34

[56] References Cited

U.S. PATENT DOCUMENTS

| | | | |
|---|---|---|---|
| 4,225,884 | 9/1980 | Block et al. | 380/20 |
| 4,528,588 | 7/1985 | Löfberg | 358/349 |
| 4,595,950 | 6/1986 | Löfberg | 380/5 |
| 4,670,857 | 6/1987 | Rackman | 380/5 X |

OTHER PUBLICATIONS

Rae Atkey, "How You Can Censor Your Child's TV Viewing", The News Editorial (Adelaide) 8/25/1986.

Primary Examiner—Stephen C. Buczinski
Assistant Examiner—Bernarr Earl Gregory

[57] ABSTRACT

A classification code, recorded repeatedly along with program material, is recovered on playing a video recording, and used to inhibit replay if the recovered code matches any of a set of codes specified by the user. The codes which cause replay to be inhibited can be set by the user after entering a personal identity number. The user can optionally request that a code be recorded when recording a program. Signals are optionally provided so that an auxiliary device, such as a second video player, can be controlled in response to codes recovered. One application is to prevent children viewing certain video recordings without parental permission.

22 Claims, 5 Drawing Sheets

SELECTIVE VIDEO PLAYING SYSTEM

FIELD OF THE INVENTION

The present invention relates to methods of, and apparatus for, controlling the playing of video programs recorded on tape or other storage medium. The term video program also includes an accompanying audio signal if any.

BACKGROUND OF THE INVENTION

With the ready availability of video tape recordings and domestic equipment upon which they can be played, there is a need to restric access of certain groups of people to certain classes of program. For example it might be desired to prevent children viewing certain classes of material, for example pornographic or violent movies. Traditionally, such security needs have been addressed by physically preventing unauthorized persons from having access to restricted recordings. This method is becoming less practical as the availability of both videotapes and machines to play them increases. For example, parents who wish to have pornographic videotapes in the home, for adult viewing only, risks a child finding the tape and playing it in the parent' absence.

It is therefore desirable to provide means whereby display of preselected classifications of program material can be viewed only by authorized persons.

Arrangements for making video pragrams available to only authorised viewers have long been used in the context of subscription television services and the like. These schemes commonly use a form of scrambling to make the signal unintelligible except to authorized persons in possesion of appropriate un-scrambling means. While it would be possible to apply similar techniques to video programs, for example scrambling pornographic movies, this would have the undesired consequence of rendering these tapes unusable to all persons who do not have special replay means. For many purposes, such as the domestic situation cited above, it is desirable that in the default condition, that is when using standard equipment, the tape plays normally. This means that a specially equipped tape player is only required if it is desired to take advantage of the restricted viewing capability.

Prior-art video security means have also been directed to providing control of viewer access by the party from whom the program originates. This is not always satisfactory, for example in the case of parental control of children's viewing, it is desirable that the parent, rather than the publisher or supplier of the video tape, be able to select whether a given tape will be viewable or not.

SUMMARY OF THE INVENTION

The present invention is directed to providing novel and improved means and method of controlling the playing of video recordings whereby authorised persons can select which classifications of material can be viewed.

According to a first aspect of the present invention, there is provided a video recording playing method comprising the steps of replaying a video program, recovering from the replayed signal a classification code accompanying the recording, comparing the recovered classification signal to a set of user-selected classifications, and depending on the result of this comparison, causing the replay of the program to be suspended or terminated.

According to a second aspect of this inventive concept, apparatus for playing a video recording is provided, comprising video recording replay means, classification code detector means, a comparator equipped to compare the recovered classification code to a set of user-selected classifications, and a controller capable of causing suspension or termination of replay on detection at the output of the comparator a signal indicating equality between the recovered classification code and a set of user-selected classifications.

Some embodiments of this invention also include an arrangement for enabling access to selection of classifications which are to cause suspension or termination of replay only after entering a security code, or personal identification number (PIN), by the user.

In the case of commercially pre-recorded video tapes, the classification code is recorded before distribution to the consumer, for example by the publisher or duplicator of the recordings. In cases where it is desired to control viewing of material recorded privately, for example off-air or by camera, recording means for combining a classification code with the recorded program can be provided as well.

BRIEF DESCRIPTION OF THE DRAWINGS

An embodiment of the present invention will now be described, by way of example only, with reference to the drawings in which.

DETAILED DESCRIPTION

Figure 1:
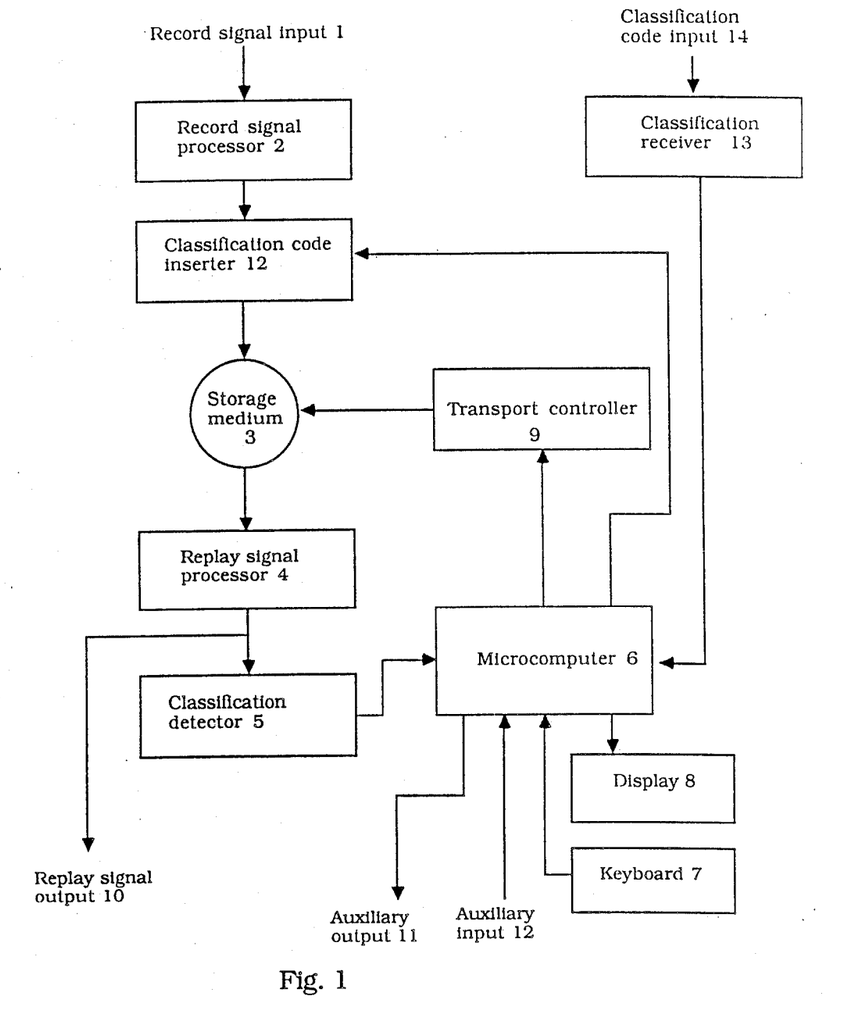
FIG. 1 is a schematic block diagram of an embodiment of the invention which includes means for optionally recording classification and program.

As seen in FIG. 1 this embodiment of the invention comprises the conventional components of a video recorder/player (commonly known as VCR), including record signal processor 2, replay signal processor 4, transport controller 9 and storage medium 3, which is typically a video cassette, but may also be a video disk or any other suitable storage medium.

The operation of this embodiment relies on the presence of a program classification code within the video signal. This can be provided in a number of well known ways which ensure that the presence of such codes do not interfere with the normal viewing of video programs. The method used in this embodiment is encoding of a digital word in the form of black and white transitions located on line 16 of the video signal. This position is chosen so as to be invisible on the CRT display. The technology for this form of signalling is well known, being commonly used for data broadcasting services such as Teletext.

For the purpose of recording a program and inserting a classification code for later use by the invention, classification code inserter 12 inserts a code, dictated by microcomputer 6, into line 16 of the video signal as it is recorded.

Classification detector 5 extracts line 16 from the replay signal, and presents the code found therein to an input of microcomputer 6.

Microcomputer 6 is self-contained "single chip computer" including RAM, ROM, IO ports, CPU and NV (non-volatile) memory. Microcomputer 6 may also perform many other functions required by the VCR, in addition to those specific to this invention. One of the output ports of microcomputer 6 controls transport controller 9. Other ports read data from keyboard 7 and send data to display 8.

Keyboard 7 is a press-button key array, which contains keys for control of all the usual VCR functions, as well as special keys used by this invention. The special keys include a SET CLASSIFICATION key, used for entering the classifications of undesired material, and an OVERRIDE key, used to disable the selective playing function and play a recording irrespective of classification. The channel selection keys commonly found on VCRs are used in this embodiment to serve the double purpose of allowing the user to enter a PIN (personal identity number). Similarly, the other keys of the VCR can serve double functions if desired.

Display 8 is used to signal the user as required. In this embodiment it comprises an eight character liquid crystal display. In other embodiments other forms of display can be used, including single LEDs or a video character generator which causes characters to be superimposed on the CRT display.

Figure 2:
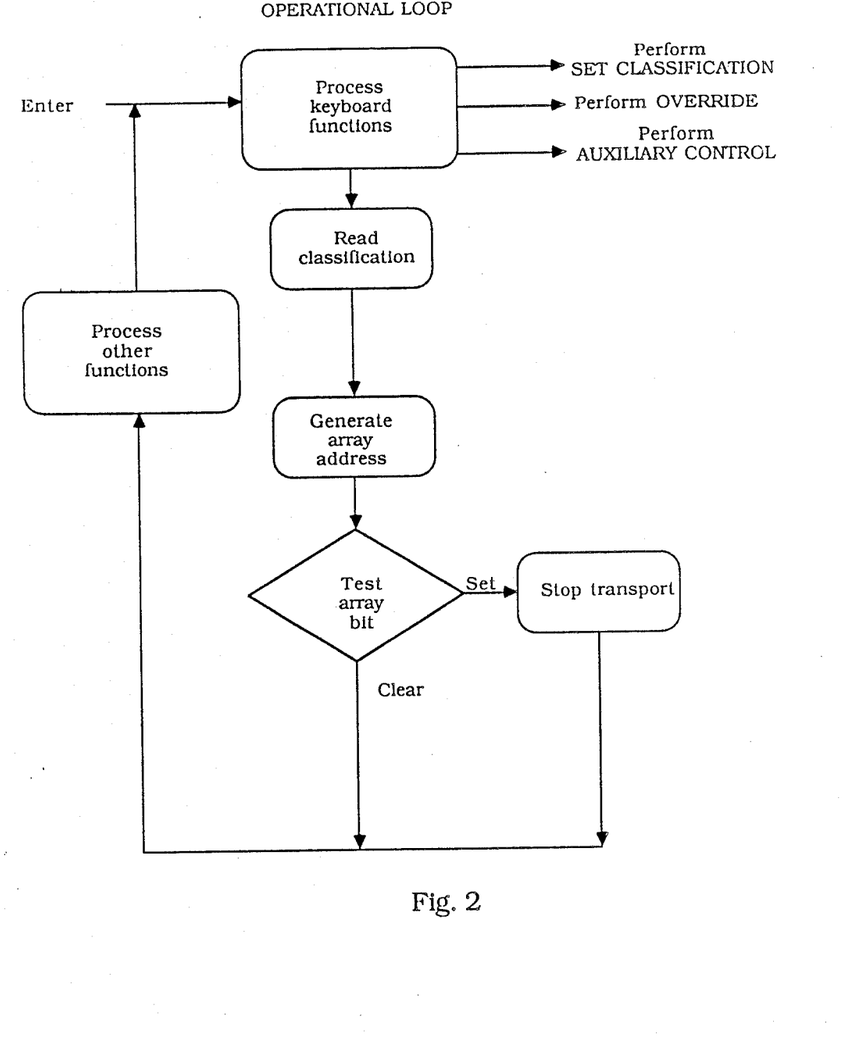
FIG. 2 is a schematic diagram of the operational loop of the programme executed by the microcomputer of this embodiment.

The selective viewing function of the invention is performed by the arrangement of FIG. 1 executing the program described schematically in FIG. 2 while a recordings is being played.

Referring now to FIG. 2, the program starts by scanning the keyboard to test for a key depression. If no key is pressed, the classification code, arriving from classification detector 5, is read, and an address is generated as a function of the code. A table is stored in the memory of microcomputer 6, the address of each data bit of the table corresponding to a unique classification code, and the state of each bit so addressed indicating the classification status, namely ENABLED or DISABLED. A set bit indicates DISABLED, while a clear bit indicates ENABLED. Having generated an address from the received code, microcomputer 6 then applies this address to the table, and tests the corresponding data bit. If the bit is set, microcomputer 6 signals transport controller 9 to stop replay. If the bit is clear, playing continues uninterrupted. This procedure is repeated as a loop at high speed, so that playing is quickly terminated on receipt of a classification code corresponding to undesired program content.

In order to allow authorised users to select whether a given classification code is to be enabled or disabled, the program of FIG. 2 also continually scans the keyboard, testing for depression of the SET CLASSIFICATION key. If this key is pressed, the SET CLASSIFICATION routine is performed, according to FIG. 3.

Figure 3:
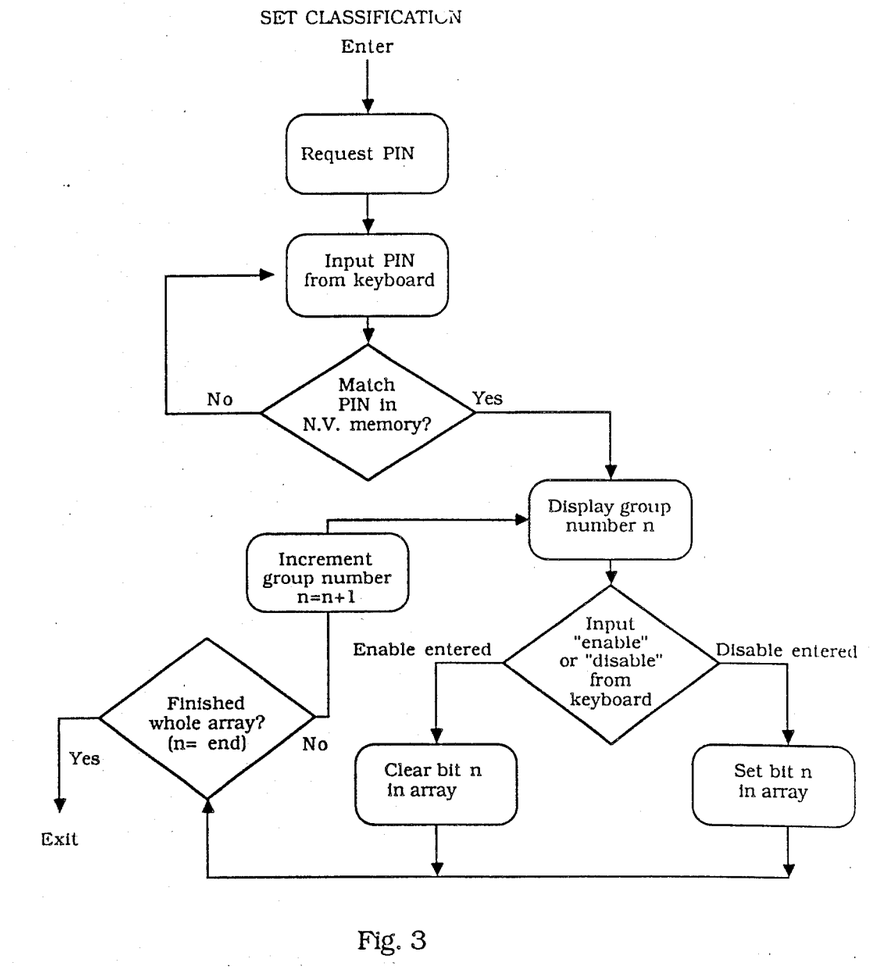
FIG. 3 is a schematic diagram of the software used for selecting which classifications cause suspension or termination of playing.

Referring now to FIG. 3, when the SET CLASSIFICATION key has been pressed, microcomputer 6 first requests, via display 8, that the user enter a PIN (personal identity number). A number is then input, in this embodiment three digits being used for security, and compared to the PIN stored in the NV memory of microcomputer 6. If the number does not match, the request is repeated. If the number does match, the first classification group number is displayed, and the user is requested to enter enable or disable, using two designated keys of keyboard 7. If enable is entered, the first bit of the code array is cleared. If disable is entered, the bit is set. A test is then performed to see whether the whole array has been programmed. If it has, control is returned to the operational loop, if not, the next array element is addressed, and the input cycle repeated for the next classification code.

In this embodiment the array comprises three bits, corresponding to the classifications:
 1. Violent
 2. Sexually explicit
 3. Adult only The coding scheme of this embodiment uses an eight bit word, so that up to 256 classifications can be supported. The 253 unused bits of the array are cleared, so that all classifications other than the three listed above are always playable. If desired, this range of classifications can be extended greatly, by increasing the size of the memory array.

When an authorised person, for example a parent, desires to watch a program of disabled classification, it may be inconvenient to re-define the classifications enabled. For convenience, this embodiment provides an override function, which is invoked by pressing the OVERRIDE key of keyboard 7. Depression of this key is detected by the test in the operational loop of FIG. 2, and results in the execution of the override routine of FIG. 4.

Figure 4:
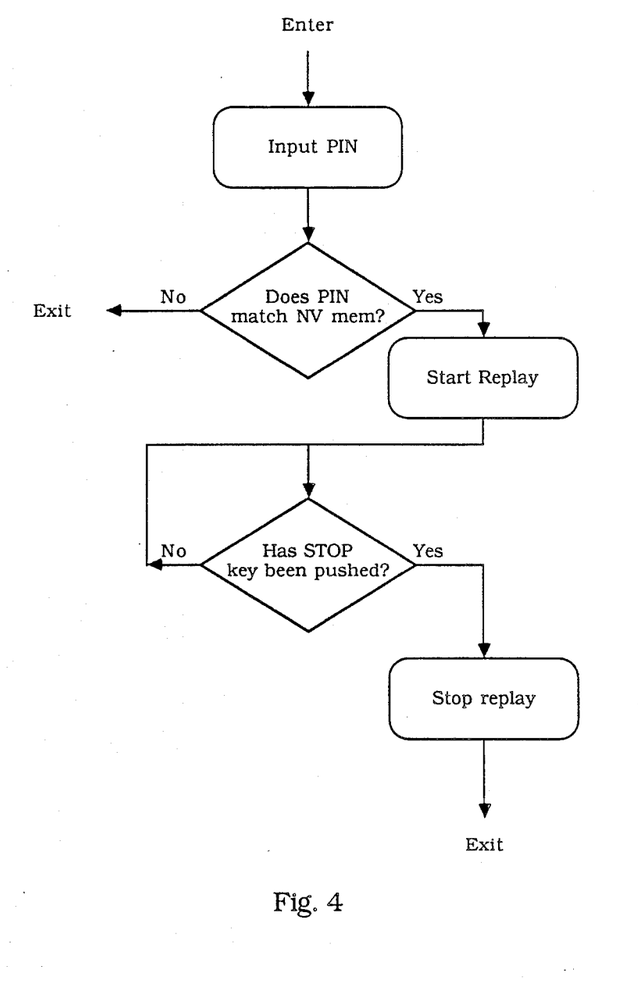
FIG. 4 is a schematic diagram of the software used for overriding the suspension or termination function.

Referring to FIG. 4, on entry to the override routine, the PIN is requested from the user. If the PIN does not match the number stored in NV memory, the routine terminates. If the correct PIN has been entered, replay is started, and the program continues looping until the STOP key is pressed, with the result that replay continues until the STOP key is pressed, irrespective of classification.

The operation so far described assumes that the tape being played has been processed so that a classification code is included in the video signal. This is applicable, for example, to pre-recorded tapes which are available for rental, and which have been provided with suitable codes by the supplier. This will also occur if the broadcaster of a program being recorded off-air has included a suitable code in the transmission. In cases where a recording is made of a program which does not contain the code, it is possible, using this embodiment, to include a code in the recording, for subsequent use in restricting viewing.

One way this can be achieved is by entering a code, using keyboard 7, prior to or during recording. Microcomputer 6 sends the input code to classification code inserter 12, where the code is combined with the video signal being recorded. This mode is useful if, for example, a pornographic movie is being recorded off-air by a parent who desires that the children of the household will not be able to replay it.

Another way codes can be recorded is to receive them from a remote source, such as a station where broadcast programs are being monitored and appropriate classifications are being transmitted, In this case, the classification code arriving at classification code input 14 is received by classification receiver 13, which presents the received classification to an input of microcomputer 6. Microcomputer 6 then instructs classification inseter 12 to insert the current code into the recorded signal. An application of this technique is to record programs and classifications in cases where classifications might change from time to time, or where the person operating the VCR is not present during the whole recording and is therefore not able to enter classifications manually.

The selective playing function described above is directed to simply terminating replay of a tape which is of a prohibited classification. This is a desirable capability if, for example, the objetive is to prevent children watching pornographic tapes. A further capability of the invention, directed to providing means for replacing unwanted program with programme from another source, will now be described.

Figure 5:
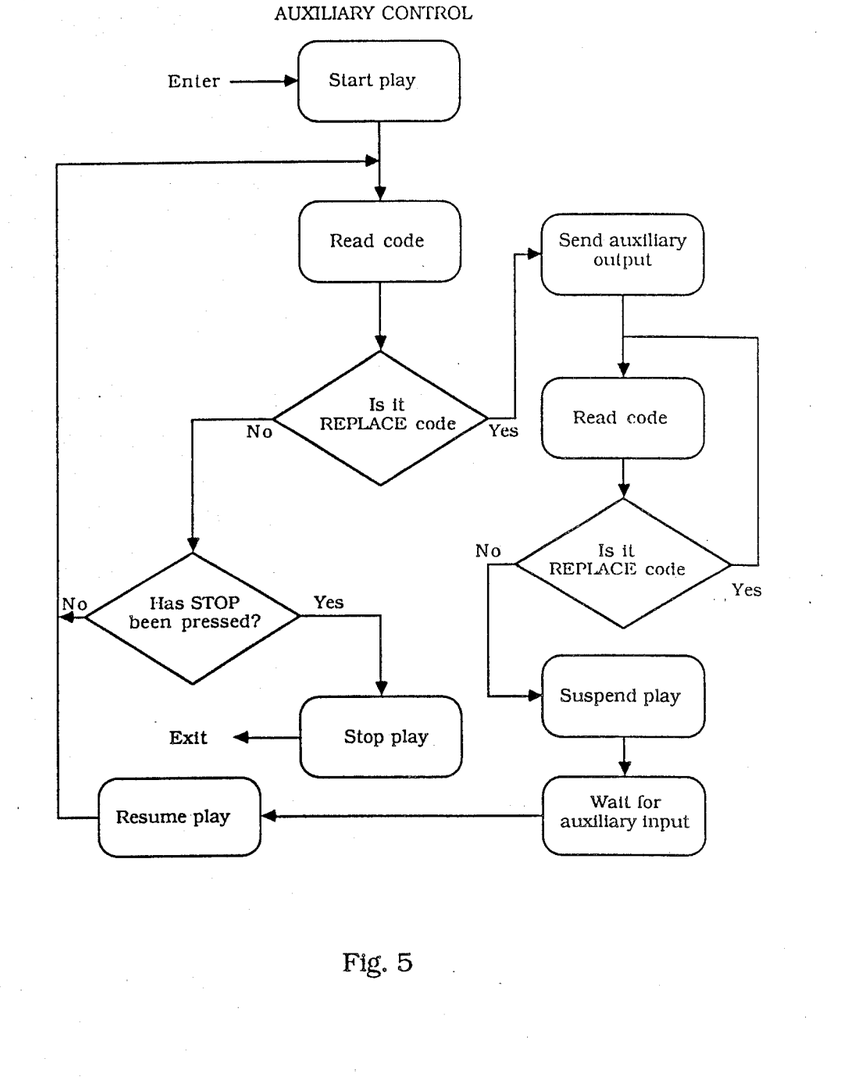
FIG. 5 is a schematic block diagram of the software used for control of auxiliary devices.

Referring again to FIG. 1, microcomputer 6 is provided with auxiliary output 11 and auxiliary input 12, which are used under control of the programs shown schematically in FIG. 5 to provide substitution of alternative programme on detection of prescribed codes.

Referring now also to FIG. 5, on entry to the auxiliary control program, microcomputer 6 starts playing. The detected classification code, recovered from the recording, is then read, and unless the code is a code designated as "REPLACE", the process is repeated until the STOP key is pressed. If a REPLACE code is detected, a signal is sent to auxiliary output 11. On receipt of this signal, an auxiliary device, such as another VCR, responds by playing another recording, and an auxiliary switching device selects the substitute material to be displayed instead of the signal from replay signal output 10. Microcomputer 6 continues reading replayed codes from classification detector 5 until the REPLACE code is no longer detected, at which time microcomputer 6 suspends replay by issuing a suitable command to transport controller 9. The main program tape is now positioned beyond the material to be replaced and ready to resume playing the desired program. When the auxiliary device has finished replaying the substitute program, it sends a signal to auxiliary input 12, which is received by microcomputer 6 which causes replay of the first program to resume. In some cases it may be desirable to advance quickly through unwanted program carrying the REPLACE code, for example using the fast-forward or picture-search capabilities of the transport mechanism. An application of this substitution capability of this embodiment is replacing advertisements within a recorded program with alternative advertisements or information. In this case, the auxiliary device can be a VCR which plays a recording comprising a number of advertisements or messages, each of which is longer in duration than the material to be replaced, ensuring that the main program into which the alternative material is to be inserted resumes without interruption on receipt of the auxiliary input signal at the conclusion of the inserted segment. The main program can consist of a number of segments separated by advertisements to be substituted, carrying REPLACE code, or by short breaks of, say, black program carrying REPLACE code.

The foregoing describes only some embodiments of the invention and modifications, obvious to those skilled in the art, can be made without departing from the scope of the present invention.

For example, in cases where one of several available channels of broadcast program is being recorded prior to subsequent replay, and classification codes are being received from a remote source for combining with the program, it is desirable that each classification code received be identified as relating to a particular channel, and only the code relating to the channel being recorded be combined with the recorded signal. This feature is easily added to the embodiments described, especially in cases where the keyboard and microcomputer of the invention are also used to control the channel selection functions of the television receiver.

Whereas the embodiment of the invention described above relies upon signals encoded into the video portion of the video program, the invention can also be effectively implemented using signals embedded into the audio portion of the program using any of the available well-known techniques which do not interfere with normal sound reception.

Whereas the embodiment described above uses control of the tape transport mechanism to inhibit playing, the invention can also be realised using other means of suppressing replay, for example, disabling the output signal without stopping tape motion.

The invention is also not limited to application with tape as the recording medium, being equally suited to use with video disk or any other video storage technique.

The classification code used by this invention can also be used to provide other useful additional functions, such as displaying the title of the program being played, locating a particular program on a videotape, or gathering data for audience research purposes.

What I claim is:

1. A video recording playing method comprising the steps of:
   receiving, from a video storage medium, signals representative of a video program,
   processing said signals to produce video signals of a form suitable for display,
   detecting a classification code within the signals received from the storage medium, said detected code being indicative of a class of program being played,
   inputting from the user a security code number, comparing the number input to a stored number and, if the numbers are equal, enabling selection of a set of classification codes which cause at least one of suspension or termination of playing,
   comparing the detected code to said set of classification codes, and
   selectively playing the video program according to the result of the comparison.

2. A video recording playing method according to claim 1 wherein a classification code has been previously transmitted along with a video program being broadcast, said program and code being stored on a storage medium which is subsequently replayed.

3. A video recording playing method according to claim 1, wherein the classification code forms part of the signal recorded on a video recording which is one of a number of duplicate recordings made available for acquisition by the public.

4. A video recording playing method according to claim 1, comprising the further steps of inputting from the user a code to be recorded along with a video program being recorded, inserting said code into the signal being recorded, recording the combined signals on a video storage medium, and replaying the recorded signal.

5. A video recording playing method according to claim 1, comprising the further steps of receiving a video program from a first source, receiving a classification code from a second source, combining said code with said program, recording the combined signals on a video storage medium, and replaying the recorded signal.

6. A video recording playing method according to claim 1 and including the further step of transmitting to an auxiliary device a signal indicating the classification of program being replayed.

7. A video recording playing method comprising the steps of:
receiving, from a video storage medium, signals representative of a video program,
processing said signals to produce video signals of a form suitable for display,
detecting a classification code within the signals received from the storage medium, said code being indicative of a class of program being played,
comparing the detected code to a set of selected codes,
selectively playing the video program according to the result of the comparison, and
transmitting to an auxiliary device a signal indicating the classification of program being replayed.

8. A video recording playing method comprising the steps of
receiving from a video storage medium signals representative of a video program,
processing said signals to produce video signals of a form suitable for display,
detecting a code within the signal received from the storage medium,
comparing the detected code to a set of selected codes, and, according to a predetermined result of the comparison:
sending a signal to an auxiliary device,
causing playing of the video program to be suspended,
waiting until a resumption signal is received, and resuming replay of the suspended program after receiving the resumption signal.

9. A method as in claim 8 comprising the further steps of inputting, from the user, a security code number, comparing the number input to a stored number, and if the numbers are equal, enabling selection of said set of selected codes.

10. A method as in claim 8 wherein said predetermined result of the comparison is one indicative of material substitution,
and further comprising the step of receiving and playing substitute program material from the auxiliary device until the resumption signal is received.

11. A method as in claim 10 further comprising the step of, during said predetermined comparison result and until said resumption signal is received, advancing playing the material using a fast forward function.

12. A video recording player which displays video on a video display means, comprising:
means for receiving, from a video storage medium, signals representative of a video program,
processing means for converting said signals into video signals of a form suitable for application to the video display means,
means for detecting a classification code within the signal received by the receiving means, said code being indicative of a class of program being played,
input means for accepting from the user a security code number;
enabling means for enabling selection of a set of classification codes which cause suspension or termination of playing, said enabling means enabling said selection only if the security code number input is the same as a stored security code number,
means for comparing the detected code to said set of classification codes, and
controller means for selectively playing the video program according to a result of the comparison.

13. A video recording player according to claim 12 including means for recording a video program transmitted from a remote location, said video program containing within the signal a classification code.

14. A video recording player according to claim 12, wherein the classification code forms part of the signal recorded on a video recording which is one of a number of duplicate recordings made available for acquisition by the public.

15. A video recording player according to claim 12, including means for inputting a code from the user, means for receiving video program from a remote source, means for combining said input code with said received program, and means for recording the combined signals on a video storage medium.

16. A video recording player according to claim 12, including means for receiving a video program from a first source, means for receiving a classification code from a second source, means for combining said code with said program, and means for recording the combined signals on a video storage medium.

17. A video recording player according to claim 12, including means for transmitting to an auxiliary device a signal indicating the classification of program being replayed.

18. A video recording player which displays video on a video display means, comprising:
means for receiving, from a video storage medium, signals representative of a video program,
processing means for converting said signals into video signals of a form suitable for application to the video display means,
means for detecting a classification code within the signal received by the receiving means, said code being indicative of a class of program being played,
means for comparing the detected code to a set of selected codes, and
controller means for selectively playing the video program according to a result of the comparison, and
means for transmitting to an auxiliary device a signal indicating the classification of program being played.

19. A video recording player comprising:
means for receiving, from a video storage medium, signals representative of a video program,
processing means for forming video signals of a form suitable for application to a video display means from said signals,
means for detecting a code within the signal received by the receiving means,
means for comparing the detected code to a set of selected codes, and
controller means for, according to the result of the comparison, sending a signal to an auxiliary device, to cause playing of the video program to be suspended, and responsive to a resumption signal to resume playing of the suspended program when the resumption signal is received.

20. A player as in claim 19 further comprising inputting means for inputting, from the user, a security code number, and means for comparing the number input to a stored number, and if the numbers are equal, enabling selection of said set of selected codes.

21. A player as in claim 19 wherein said predetermined result of the comparison is one indicative of material substitution, and further comprising means for receiving and playing substitute program material from the auxiliary device until the resumption signal is received.

22. A method as in claim 21 further comprising fast forward means for, during said predetermined comparison result and until said resumption signal is received, advancing playing the material using a fast forward function.

* * * * *

(12) EX PARTE REEXAMINATION CERTIFICATE (6501st)
United States Patent
Vogel (10) Number: US 4,930,158 C1
(45) Certificate Issued: Nov. 4, 2008

(54) SELECTIVE VIDEO PLAYING SYSTEM (75) Inventor: Peter S. Vogel, Faulconbridge (AU)

(73) Assignee: Guardian Media Technologies Ltd., La Jolla, CA (US)

Reexamination Request:
No. 90/007,746, Oct. 13, 2005
No. 90/008,544, Jan. 31, 2007

Reexamination Certificate for:
Patent No.: 4,930,158
Issued: May 29, 1990
Appl. No.: 07/237,175
Filed: Aug. 29, 1988

(30) Foreign Application Priority Data

Sep. 2, 1987 (AU) ................................. PI4107

(51) Int. Cl.
*G11B 27/10* (2006.01)
*H04N 7/16* (2006.01)

(52) U.S. Cl. ................... 386/94; 348/E7.06; 380/202; 725/142; 725/28

(58) Field of Classification Search ................ None
See application file for complete search history.

(56) References Cited

U.S. PATENT DOCUMENTS

| | | | |
|---|---|---|---|
| 3,673,318 A | 6/1972 | Olsen | 178/5.8 R |
| 3,859,457 A | 1/1975 | Kirk | 178/5.1 |
| 3,919,462 A | 11/1975 | Hartung | 178/5.1 |
| 3,919,479 A | 11/1975 | Moon | 179/1 |
| 4,068,264 A | 1/1978 | Pires | 358/122 |
| 4,114,139 A | 9/1978 | Boyd | 340/147 |
| 4,215,366 A | 7/1980 | Davidson | 358/124 |
| 4,225,884 A | 9/1980 | Block | 358/122 |
| 4,229,765 A | 10/1980 | Sanger | 358/188 |
| 4,245,245 A | 1/1981 | Matsumoto | 358/122 |
| 4,266,098 A | 5/1981 | Novak | 179/5.5 |
| 4,280,139 A | 7/1981 | Mogi | 358/165 |
| 4,325,078 A | 4/1982 | Seaton | 358/117 |
| 4,331,974 A | 5/1982 | Cogswell | 358/86 |
| 4,333,110 A | 6/1982 | Faerber | 358/165 |
| 4,338,628 A | 7/1982 | Payne | 358/120 |
| 4,348,696 A | 9/1982 | Beier | 358/188 |
| 4,354,201 A | 10/1982 | Sechet | 358/122 |
| 4,375,651 A | 3/1983 | Templin | 358/191.1 |
| 4,386,436 A | 5/1983 | Kocher | 455/151 |
| 4,398,193 A | 8/1983 | Kuniyoshi | 340/825.76 |
| 4,425,579 A | 1/1984 | Merrell | 358/86 |
| 4,484,217 A | 11/1984 | Block et al. | 358/84 |

(Continued)

FOREIGN PATENT DOCUMENTS

| | | |
|---|---|---|
| AU | 536261 B | 5/1982 |
| AU | 80145-82 | 10/1982 |
| AU | 56757-86 | 11/1986 |
| EP | A-0-053885 | 6/1982 |
| EP | 0112575 A1 | 12/1983 |
| EP | 0112575 B1 | 3/1986 |
| GB | 1424739 A | 2/1976 |
| GB | 8138341 | 6/1983 |
| GB | 2206759 A | 1/1989 |
| GB | 2206759 B | 1/1992 |
| JP | 59-210782 | 11/1984 |

OTHER PUBLICATIONS

Rae Atkey, "How You Can Censor Your Child's TV Viewing," The News Editiorial (Adelaide) Aug. 25, 1986.

*Primary Examiner*—Ovidio Escalante (57) ABSTRACT

A classification code, recorded repeatedly along with program material, is recovered on playing a video recording, and used to inhibit replay if the recovered code matches any of a set of codes specified by the user. The codes which cause replay to be inhibited can be set by the user after entering a personal identity number. The user can optionally request that a code be recorded when recording a program. Signals are optionally provided so that an auxiliary device, such as a second video player, can be controlled in response to codes recovered. One application is to prevent children viewing certain video recordings without parental permission.

U.S. PATENT DOCUMENTS

| | | | |
|---|---|---|---|
| 4,488,179 A | 12/1984 | Krüger | 358/181 |
| 4,510,623 A | 4/1985 | Bonneau | 455/181 |
| 4,520,404 A | 5/1985 | Von Kohorn | 358/355 |
| 4,528,588 A | 7/1985 | Löfberg | 358/122 |
| 4,528,589 A | 7/1985 | Block et al. | 358/122 |
| 4,530,008 A | 7/1985 | McVoy | 358/123 |
| 4,536,791 A | 8/1985 | Campbell | 358/122 |
| 4,554,584 A | 11/1985 | Elam et al. | 358/165 |
| 4,588,857 A | 5/1986 | Arsem | 179/6.06 |
| 4,591,664 A | 5/1986 | Freeman | 179/6.06 |
| 4,595,950 A | 6/1986 | Löfberg | 358/122 |
| 4,598,288 A | 7/1986 | Yarbrough | 340/825.34 |
| 4,599,647 A | 7/1986 | George | 358/122 |
| 4,600,921 A | 7/1986 | Thomas | 340/825.31 |
| 4,602,297 A | 7/1986 | Reese | 360/14.1 |
| 4,605,964 A | 8/1986 | Chard | |
| 4,605,973 A | 8/1986 | Von Kohorn | 358/335 |
| 4,620,229 A | 10/1986 | Amano et al. | |
| 4,670,857 A | 6/1987 | Rackman | 380/4 |
| 4,685,131 A | 8/1987 | Horne | 380/20 |
| 4,695,904 A | 9/1987 | Shinyagaito | 358/342 |
| 4,696,034 A * | 9/1987 | Wiedemer | 380/230 |
| 4,718,107 A | 1/1988 | Hayes | |
| 4,729,044 A | 3/1988 | Kiesel | 360/14.3 |
| 4,750,213 A | 6/1988 | Novak | 455/67 |
| 4,787,063 A | 11/1988 | Muguet | 364/900 |
| 4,814,883 A | 3/1989 | Perine | 358/181 |
| 4,888,796 A | 12/1989 | Olivo, Jr. | |
| 4,896,354 A | 1/1990 | Inagaki et al. | |
| 4,939,596 A | 7/1990 | Takayama | 360/27 |

\* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 8–11 and 19–22 is confirmed.

Claims 1–7 and 12–18 are cancelled.

* * * * *